(12) United States Patent
Umezawa et al.

(10) Patent No.: US 8,782,141 B2
(45) Date of Patent: Jul. 15, 2014

(54) COMMUNICATION SYSTEM, DEVICE AND PROGRAM FOR EXCHANGING MESSAGES BETWEEN MEMBERS OF CYBER COMMUNITIES

(75) Inventors: Yohei Umezawa, Tokyo (JP); Yasushi Toda, Tokyo (JP)

(73) Assignee: NEC Corporation, Tokyo (JP)

( * ) Notice: Subject to any disclaimer, the term of this patent is extended or adjusted under 35 U.S.C. 154(b) by 1560 days.

(21) Appl. No.: 11/599,811

(22) Filed: Nov. 15, 2006

(65) Prior Publication Data

US 2007/0124403 A1 May 31, 2007

(30) Foreign Application Priority Data

Nov. 15, 2005 (JP) ................................. 2005-330720

(51) Int. Cl.
*G06F 15/16* (2006.01)
*H04M 1/663* (2006.01)
*H04M 1/725* (2006.01)

(52) U.S. Cl.
USPC .......................... 709/206; 709/204; 455/412.2

(58) Field of Classification Search
CPC .. H04L 51/38; H04L 12/5895; H04L 12/1822
USPC ......... 709/206, 204, 226; 715/753; 455/412.2
See application file for complete search history.

(56) References Cited

U.S. PATENT DOCUMENTS

| | | | |
|---|---|---|---|
| 7,819,749 B1* | 10/2010 | Fish et al. .................... | 463/42 |
| 2002/0059379 A1* | 5/2002 | Harvey et al. ................ | 709/205 |
| 2005/0114527 A1* | 5/2005 | Hankey et al. ............... | 709/228 |
| 2005/0198299 A1 | 9/2005 | Beck et al. | |
| 2006/0009243 A1* | 1/2006 | Dahan et al. .................. | 455/466 |
| 2006/0084450 A1* | 4/2006 | Dam Nielsen et al. ....... | 455/466 |
| 2008/0057910 A1* | 3/2008 | Thoresson et al. ......... | 455/412.1 |

FOREIGN PATENT DOCUMENTS

| | | |
|---|---|---|
| JP | 6-44170 | 2/1994 |
| JP | 10075260 A | 3/1998 |
| JP | 10-247936 | 9/1998 |
| JP | 2000101746 A | 4/2000 |
| JP | 2000-148615 | 5/2000 |
| JP | 2001-168901 | 6/2001 |
| JP | 2003006519 A | 1/2003 |
| JP | 2003281173 A | 10/2003 |
| JP | 2003304320 A | 10/2003 |

(Continued)

OTHER PUBLICATIONS

Daichi Itoh, "Cellular phone is hot!—high capacity, cooperated with other media, competition for standby screen and diversifying new services—, iNTERNET magazine make innovation with technology!", Impress, Inc., Japan, Apr. 1, 2005, vol. 123, p. 58-61.

(Continued)

*Primary Examiner* — Nicholas Jensen
(74) *Attorney, Agent, or Firm* — Scully, Scott, Murphy & Presser PC

(57) ABSTRACT

In a communication system using a standby screen, a portable communication terminal accesses a communication server at a predetermined time interval, uses RSS to receive and store new messages in a cyber sub-community in which the portable communication terminal participates, and sequentially displays tag buttons on the standby screen to display new-message arrivals with message-issuing member names and titles displayed on the buttons.

8 Claims, 12 Drawing Sheets

(56) References Cited

FOREIGN PATENT DOCUMENTS

| JP | 2004-147314 | 5/2004 |
|---|---|---|
| JP | 2005-033716 | 2/2005 |
| JP | 2005-157991 | 6/2005 |
| KR | 10-2004-0023148 | 3/2004 |
| KR | 10-2005-0013727 | 2/2005 |
| WO | 03/107146 A2 | 12/2003 |

OTHER PUBLICATIONS

Japanese Office Action dated Apr. 26, 2011 together with English language translation.
Extended European Search Report dated Apr. 21, 2011.

* cited by examiner

COMMUNICATION SYSTEM, DEVICE AND PROGRAM FOR EXCHANGING MESSAGES BETWEEN MEMBERS OF CYBER COMMUNITIES

FIELD OF THE INVENTION

The present invention relates to a portable (mobile) communication terminal and a server for exchanging information among limited members and to a communication system using the terminal and the server.

BACKGROUND OF THE INVENTION

Japanese Patent Kokai Publication No. JP-P2001-168901A discloses a method for generating a cyber community using a mailing list. With the viewpoint of the following two, that is, (1) the content of a message during communication is important but the recording of communication is not important and (2) the transmission of unsolicited mail and spam to the members registered in the mailing list should be suppressed, the community generation method described in the document proposes a communication method. This communication method sends an invitation mail to the member candidates each time a community is generated to ask them whether to join the community, and to the members who refuse to join the community, does not send unnecessary mail.

Japanese Patent Kokai Publication No. JP-P2005-157991A introduces a mobile phone in which a schedule book application having the mail send/receive function is installed.

[Patent Document 1]
Japanese Patent Kokai Publication No. JP-P2001-168901A

[Patent Document 2]
Japanese Patent Kokai Publication No. JP-P2005-157991A

However, when a user is a member candidate for multiple communities, the method disclosed in Patent Document 1, in which a user is asked whether to join each time a community is generated, increases the burden on the user side. Basically, the community generation method disclosed in Patent Document 1 uses the above procedure to suppress the transmission of unsolicited mail or spam. Therefore, if some other countermeasures against unsolicited mail and spam are available, a non-strict (or loose) method that allows the user to remain belonging to a once-joined community is more convenient if the user and the cyber community have some trust each other.

However, even the above-described method that allows the user to remain belonging to a cyber community requires the user to access a cyber community each time the user wants to check for new messages. The problem is that the operation to check for messages is cumbersome on the restricted display screen or operation means of a portable communication terminal that is not so easy to operate.

Especially, when the user joins multiple cyber communities, the user must circulating visit those multiple cyber communities. Even if automatic site circulating visit software is available, the software is required to always be active to instantly confirm the content of new messages from multiple communities. This requirement prevents the standby screen, on which a layout of time-of-day, calendar, or a favorite picture is displayed, from being used.

SUMMARY OF THE DISCLOSURE

In view of the foregoing, it is an object of the present invention to provide an easy-to-use interface, designed for communication with cyber communities, that allows the user to instantly confirm the arrival of messages and their summaries without special operations.

According to a first aspect of the present invention, there are provided a portable communication terminal and a program product that implements the portable communication terminal. The portable communication terminal is connectable to a server that provides a cyber sub-community in which a new message is delivered and/or accumulated messages are browsed for message exchange among limited members, wherein the portable communication terminal accesses the server at a predetermined time interval, automatically receives new messages in the cyber sub-community in which the communication portable terminal participates, and displays new-message arrival on a standby screen using text included in the new messages.

According to a second aspect of the present invention, there is provided a portable communication terminal connectable to a server that provides a cyber sub-community in which a new message is delivered and/or accumulated messages are browsed for message exchange among limited members. The portable communication terminal comprises: means for requesting the server to open the cyber sub-community and to send to any address an invitation mail to the cyber sub-community; means for accessing the server to participate and registering in the cyber sub-community in response to an invitation mail from other users; and means for accessing the server, displaying a list of participating cyber sub-communities and accepting a selected cyber sub-community from the list and, at the same time, browsing messages of, and contributing messages to, the selected cyber sub-community, wherein the portable communication terminal accesses the server at a predetermined time interval, automatically receives new messages in the cyber sub-community in which the communication portable terminal participates, and displays new-message arrivals on a standby screen using text included in the new messages.

According to a third aspect in the portable communication terminal according to the first or second aspect, it is preferred that the new messages are sent via XML (extensible Mark-up Language) files or RDF (Resource Description Framework) files, each of the files having a title field including a message-issuing member name and a message title, and the titles included in the XML files or the RDF files are displayed in a band area provided on the standby screen in order of arrival to display the new-message arrivals.

According to a fourth aspect in the foregoing aspects, one of the new-message arrival displays on the standby screen is selected and started to cause a transition to a browse screen of a corresponding new message.

According to a fifth aspect in the foregoing aspects, a font or a background color of the new-message arrival displays can be selectively set.

According to a sixth aspect, there is provided a program product causing a portable communication terminal to execute an operation, the portable communication terminal being connectable to a server that provides a cyber sub-community in which new messages are delivered and/or accumulated messages are browsed for message exchange among limited members, wherein the program product causes the portable communication terminal to access the server at a predetermined time interval, to automatically receive new messages in the cyber sub-community in which the communication portable terminal participates, and to display new-message arrivals on a standby screen using text included in the new messages.

According to a seventh aspect, there is provided a program product causing a portable communication terminal to execute an operation, the portable communication terminal being connectable to a server that provides a cyber sub-community in which new messages are delivered and/or accumulated messages are browsed for message exchange among limited members, the program product causing the portable communication terminal to execute steps comprising: requesting the server to open the cyber sub-community and to send to any address an invitation mail to the cyber sub-community; accessing the server to participate and register in the cyber sub-community in response to an invitation mail from other users; accessing the server, displaying a list of participating cyber sub-communities, accepting a selected cyber sub-community from the list; browsing messages of, and contributing messages to, the selected cyber sub-community; and accessing the server at a predetermined time interval, to automatically receive new messages in the cyber sub-community in which the communication portable terminal participates, and to display new-message arrivals on a standby screen using text included in the new messages According to an eighth aspect of the present invention, there is provided a server. The server provides a cyber sub-community in which a new message is delivered or accumulated messages are browsed for message exchange among limited members. The server comprises means for, in response to a request from a portable communication terminal, opening the cyber sub-community and sending to any address an invitation mail to the cyber sub-community; means for, in response to a request from a portable communication terminal that receives the invitation mail, accepting a request to participate and register in the cyber sub-community; and means for, in response to a request from the portable communication terminal, displaying a list of cyber sub-communities, in which the portable communication terminal participates, and accepting a request to browse messages of, and contributing messages to, a cyber sub-community selected from the cyber sub-communities displayed in the displayed list; wherein, in response to access from the portable communication terminal, the server delivers new messages in the cyber sub-community, in which the portable communication terminal participates, so that text included in new messages can be extracted.

According to a ninth aspect, there is provided a program product causing a server to execute an operation, the server providing a cyber sub-community in which new messages are delivered and/or accumulated messages are browsed for message exchange among limited members. The program product causes the server to execute steps comprising: in response to a request from a portable communication terminal, opening the cyber sub-community and sending to any address an invitation mail to the cyber sub-community; in response to a request from a portable communication terminal that receives the invitation mail, accepting a request to participate and register in the cyber sub-community; in response to a request from the portable communication terminal, displaying a list of cyber sub-communities, in which the portable communication terminal participates, and accepting a request to browse messages of, and contributing messages to, a cyber sub-community selected from the cyber sub-communities displayed in the displayed list; and in response to access from the portable communication terminal, delivering new message or messages in the cyber sub-community, in which the portable communication terminal participates, so that text included in the new message or messages can be extracted According to a tenth aspect of the present invention, there is provided a communication system comprising the server and the portable communication terminal connectable to the server via a network.

The meritorious effects of the present invention are summarized as follows.

According to the present invention, latest messages can be received automatically from a cyber community and, at the same time, the presence of a new message and its summary can be confirmed immediately.

PREFERRED EMBODIMENTS OF THE INVENTION

Figure 1:
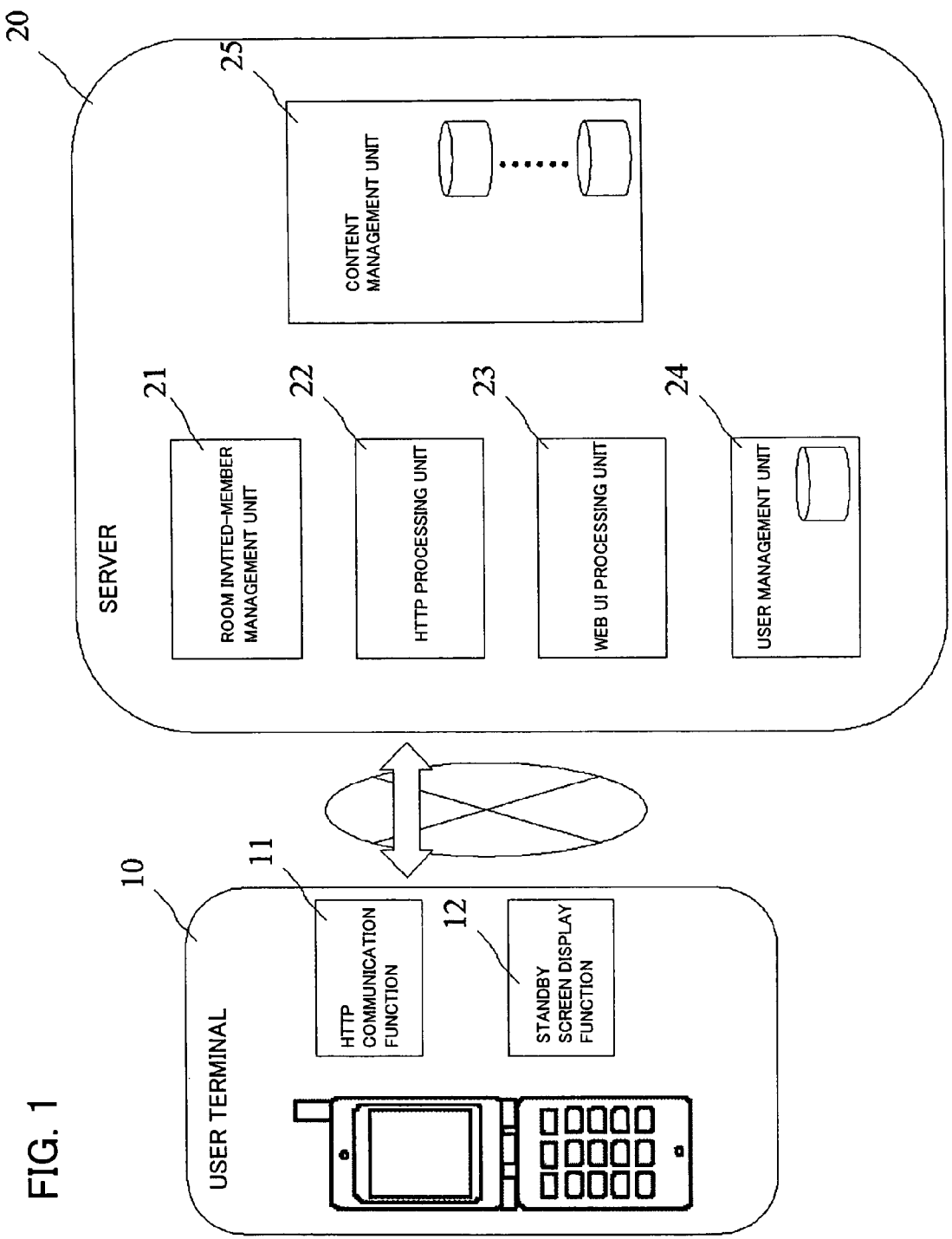
FIG. 1 is a diagram showing the configuration of a communication system in a first embodiment of the present invention.

A first embodiment of the present invention will be described in detail with reference to the drawings. FIG. 1 is a diagram showing the configuration of a communication system in a first embodiment of the present invention. FIG. 1 shows the configuration in which a user terminal 10, such as a mobile phone and a PDA (Personal Digital Assistant), and a server 20 are connected via a network.

The user terminal 10 has the following two functions: HTTP communication function 11 and standby screen display function 12. The HTTP communication function 11 is a function to communicate with the server 20 for receiving RDF (Resource Description Framework) files and XML (eXtensible Mark-up Language) files based on the RSS (Rich Site Summary/RDF Site Summary) format. The standby screen display function 12 is implemented by a special application installed for access to a cyber community (hereinafter also called "room") which will be described later (see FIG. 11 and FIG. 12).

The server 20 comprises a room invited-member management unit 21 that mails a room invitation (see X1 in FIG. 6), an HTTP processing unit 22 that performs the user registration procedure, changes the room setup, and delivers new messages via an RDF file, a web UI (User Interface) processing unit 23 that provides an interface via the web, a user management unit 24 that manages users and controls access to a room, and a content management unit 25 that maintains and manages a room content.

Next, the following describes the interaction between the user terminal 10 and the server 20 in detail by referring to an operation that is performed on the user terminal 10 and a screen transition that occurs in response to the operation.

[Standby Screen—Menu Screen]

Figure 2:
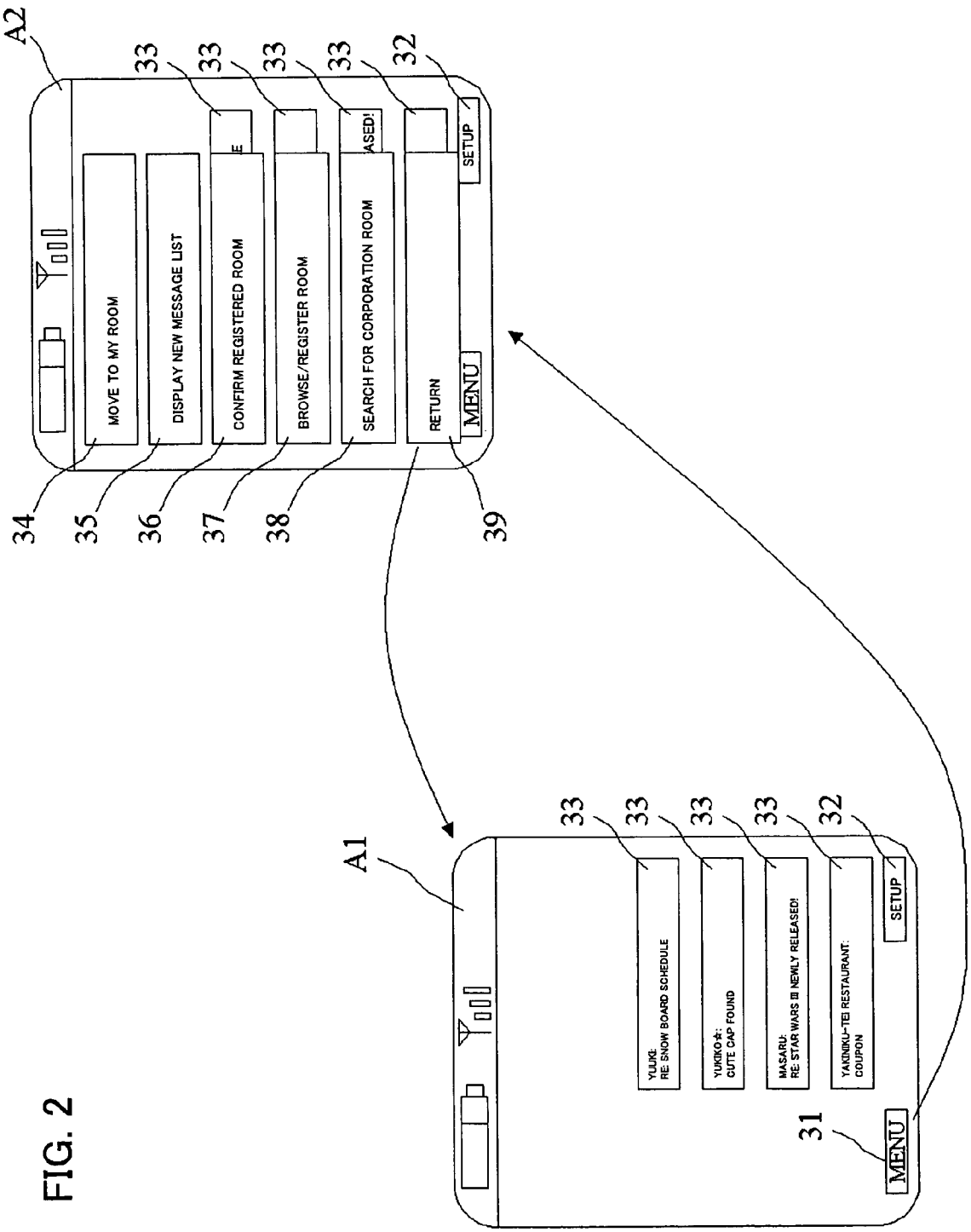
FIG. 2 is a diagram showing a screen transition from the standby screen on a user terminal in the first embodiment of the present invention.

FIG. 2 is a diagram showing a standby screen A1 and a menu screen A2 displayed by a special application running on the user terminal 10. Referring to FIG. 2, the standby screen A1 has a MENU button 31 used to call the menu screen A2, a SETUP button 32, and tag buttons 33.

When the user clicks on the MENU button 31 on the standby screen A1 shown in FIG. 2, the menu screen A2 is displayed on the standby screen A1 with the menu item buttons overlaid thereon. In the example in FIG. 2, the menu screen A2 has the following menu item buttons: "MOVE TO MY ROOM" 34, "DISPLAY NEW MESSAGE LIST" 35, "CONFIRM REGISTERED ROOM" 36, "BROWSE/REGISTER ROOM" 37, "SEARCH FOR CORPORATION ROOM" 38, and "RETURN" 39.

Clicking on the "RETURN" 39 with the menu screen A2 in FIG. 2 displayed puts the menu items in the non-display mode and displays the standby screen A1 again. The other menu buttons, that is, "MOVE TO MY ROOM" 34, "DISPLAY NEW MESSAGE LIST" 35, "CONFIRM REGISTERED ROOM" 36, "BROWSE/REGISTER ROOM" 37, and "SEARCH FOR CORPORATION ROOM" 38, will be described later.

[Standby Screen—Setup Screen]

Figure 3:
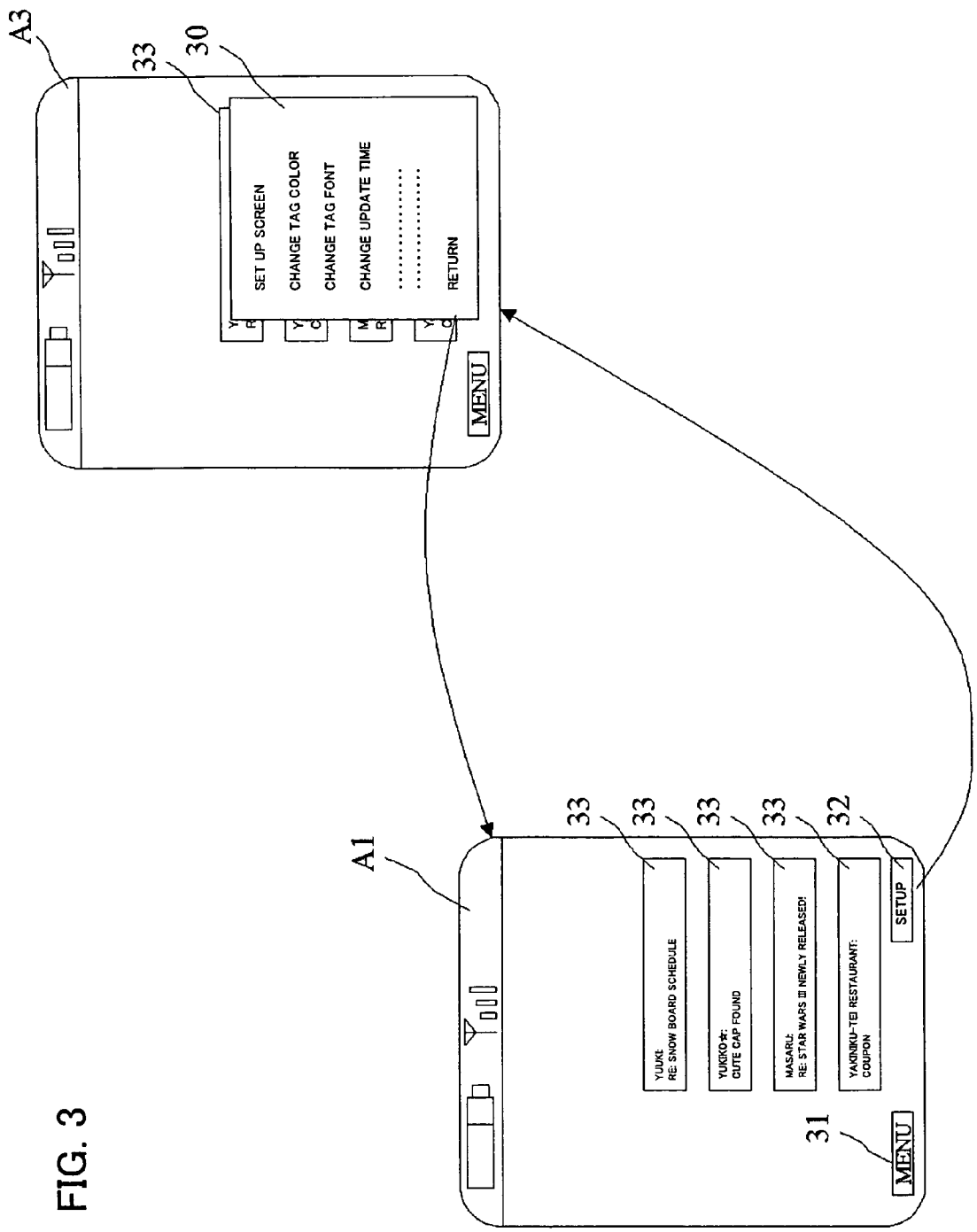
FIG. 3 is a diagram showing a screen transition from the standby screen on the user terminal in the first embodiment of the present invention.

FIG. 3 is a diagram showing the standby screen A1 and a setup screen A3 used to set up the standby screen A1. Clicking on the SETUP button 32 on the standby screen A1 in FIG. 3 displays the setup screen A3 on the standby screen A1 with the setup item list 30 overlaid thereon. In the example shown in FIG. 3, the functions included in the list are the "SET UP SCREEN" function for setting up the background screen of the standby screen A1, the display area of new messages, and the scroll-out processing used when a new message scrolls out of the standby screen, the "CHANGE TAG COLOR" function for changing the background color of the tag buttons 33, the "CHANGE TAG FONT" function for changing the setup of characters on the tag buttons 33, and the "CHANGE UPDATE TIME" function for changing the display update frequency of the tag buttons 33.

Clicking on "RETURN" at the bottom of the setup item list 30 with the setup screen A3 in FIG. 3 displayed puts the setup item list in the non-display mode and displays the standby screen A1 again.

[Move to My Room] (Management of Cyber Community)

Figure 4:
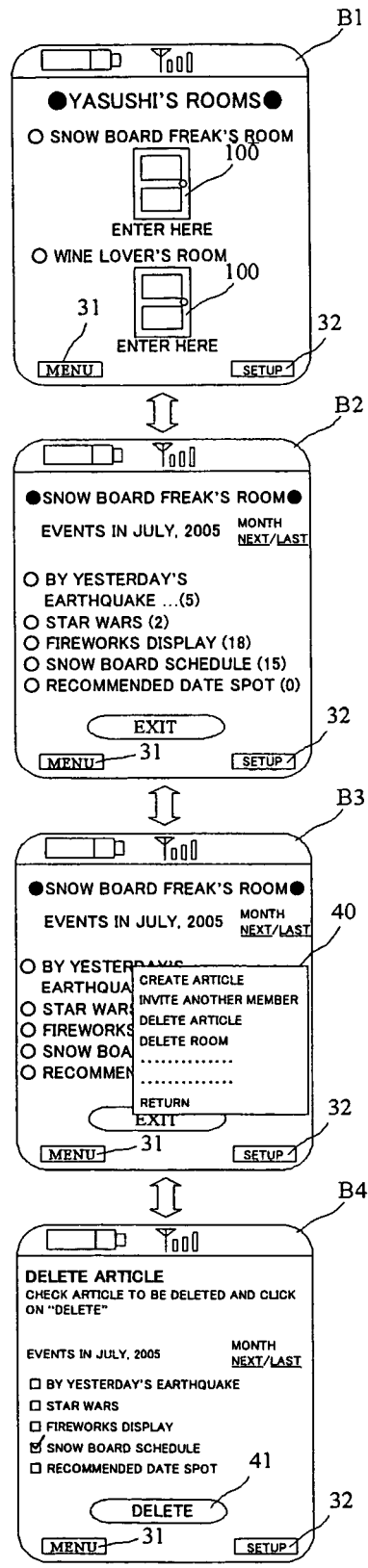
FIG. 4 is a diagram showing a screen transition (room management time) from the My Room screen on the user terminal in the first embodiment of the present invention.

Next, the following describes the flow of cyber community management in the communication system in this embodiment. FIG. 4 is a diagram showing the screen transition after the user clicks on the "MOVE TO MY ROOM" 34 on the menu screen A2.

When the user clicks on "MOVE TO MY ROOM" 34 on the menu screen A2 in FIG. 2, the authentication procedure for the server 20 is started and, based on the data received from the content management unit 25 of the server 20, a list of icons 100 of user-generated rooms is displayed as shown in B1 in FIG. 4 (hereinafter, the generation or the opening of a cyber community is called the "generation" of the cyber community). As shown in B1 in FIG. 4, it is assumed in the description below that "SNOW BOARD FREAK'S ROOM" and "WINE LOVER'S ROOM" are registered as the entries of the room "YASUSHI'S ROOM" of the user name Yasushi in the content management unit of the server 20.

For example, when the user clicks on the icon 100 of "SNOW BOARD FREAK'S ROOM" on a screen B1 in FIG. 4, a content delivery request is sent to the server 20 and a list of articles in "SNOW BOARD FREAK'S ROOM" is displayed as shown in a screen B2 in FIG. 4. The numeral in parentheses at the end of each article title on the screen B2 in FIG. 4 indicates the number of messages contributed to the article.

When the user clicks on the SETUP button 32 on the screen B2 in FIG. 4, a screen B3 is displayed with a processing selection list 40 overlaid on the screen B2 as shown in the screen B3 in FIG. 4. In the example in FIG. 4, the processing selection list 40 includes the following processing items: "CREATE ARTICLE", "INVITE ANOTHER MEMBER", "DELETE ARTICLE", and "DELETE ROOM". For example, when the user selects the processing item "DELETE ARTICLE", a screen B4 in FIG. 4 is displayed. When the user enters the check mark (✓) in the checkbox at the start of one or more articles and presses a DELETE button 41, an article deletion request is sent to the server 20 and the screen changes to the deletion screen B4 to allow the user to delete multiple articles at a time.

[Creation of Cyber Community]

Figure 5:
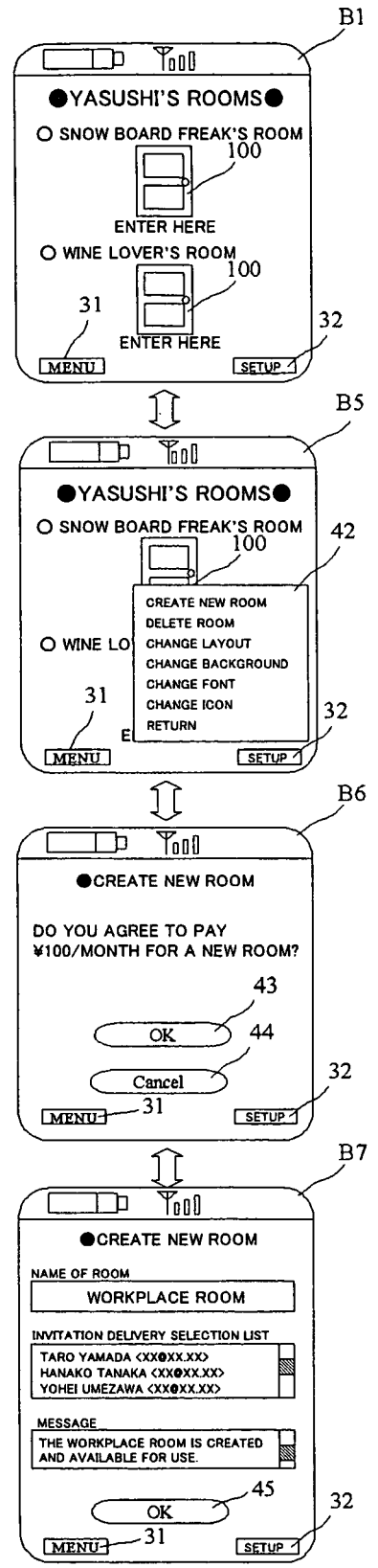
FIG. 5 is a diagram showing a screen transition (room creation time) from the My Room screen on the user terminal in the first embodiment of the present invention.

Next, the following describes the flow of the creation of a cyber community with reference to FIG. 5. For example, when the user clicks on the SETUP button 32 on the screen B1 in FIG. 5 (corresponding to screen B1 in FIG. 4), a screen B5 is displayed with a processing selection list 42 overlaid on the screen B1 as shown on the screen B5 in FIG. 5.

In the example in FIG. 5, the processing selection list 42 includes the processing items "CREATE NEW ROOM" and "DELETE ROOM", as well as the processing items "CHANGE LAYOUT", "CHANGE BACKGROUND", "CHANGE FONT", and "CHANGE ICON" for changing the room layout, background, font, and icons 100, respectively (see icons 100 in B1 in FIG. 4 and FIG. 5).

For example, when the user selects the processing item "CREATE NEW ROOM", a confirmation screen B6 is displayed to inform the user about the accounting (changing) and restrictions (or prohibitions) upon new room generation as shown in the screen B6 in FIG. 5 (only the confirmation message about accounting is displayed in B6 in FIG. 5). When the user clicks on an OK button 43 on the screen B6 in FIG. 5, a new room generation request is sent to the server 20.

In response to the room generation request from the user terminal 10, the server 20 requests the user, via the web UI processing unit 23 and the HTTP processing unit 22, to enter a room name (Name of room), invitation delivery data generated by selecting from address book data or by entering data (Invitation delivery selection list), and a message to invited members (see B7 in FIG. 5). When the user clicks on an OK button 45 on a screen B7 in FIG. 5, the user-entered data is sent to the server 20 and the new room is registered in the content management unit 25.

[Invitation to Cyber Community]

The following describes the invitation whose destination addresses and messages are entered in B7 in FIG. 5. When the user clicks on the OK button 45 in the screen B7 in FIG. 5, the server 20 registers the new room in the content management unit 25 and, at the same time, causes the room invited-member management unit 21 to send invitations via email.

Figure 6:
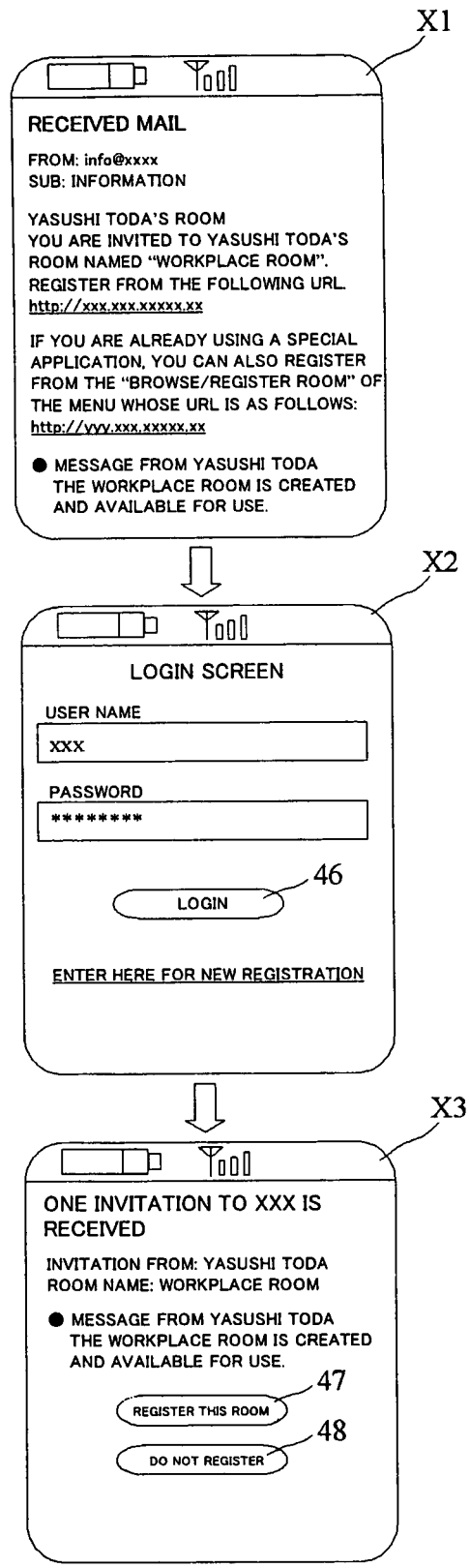
FIG. 6 is a diagram showing a procedure performed on the terminal that receives invitation mail that is sent when a room is created in the first embodiment of the present invention.

FIG. 6 is a diagram showing the procedure performed by a terminal that receives an invitation sent from the room invited-member management unit 21. Clicking on the URL included in an invitation X1 in FIG. 6 changes the screen to a login screen X2. When the user enters a user name and a password, which are acquired in advance, and clicks on a LOGIN button 46, the server 20 checks if a new invitation is received.

If a new invitation is received, a confirmation screen X3, such as the one shown in FIG. 6, is displayed on the terminal of a user, using the data received from the server 20. When the user clicks on a REGISTER IN THIS ROOM button 47, a registration request is sent to the server 20 and the user is registered as a new member of the room. On the other hand, when the user clicks on a DO NOT REGISTER button 48, a rejection notification is sent to the server 20. Upon receiving this notification, the server 20 sends an email to another user, who generated this room, to inform that the (receiving) user rejects to register in the room.

Although the user is requested to access from the URL, included in the invitation in X1 in FIG. 6, for performing the predetermined procedure in the example given above, other equivalent methods can also be used. For example, (1) both the return mail address for registration and the return mail address for registration rejection are included in the invitation and (2) the user who receives the invitation mail returns it to the sender for registration when the user wants to register in the room but sends a rejection mail to another return address only when the user rejects to register in the room.

[List of New Messages]

Figure 7:
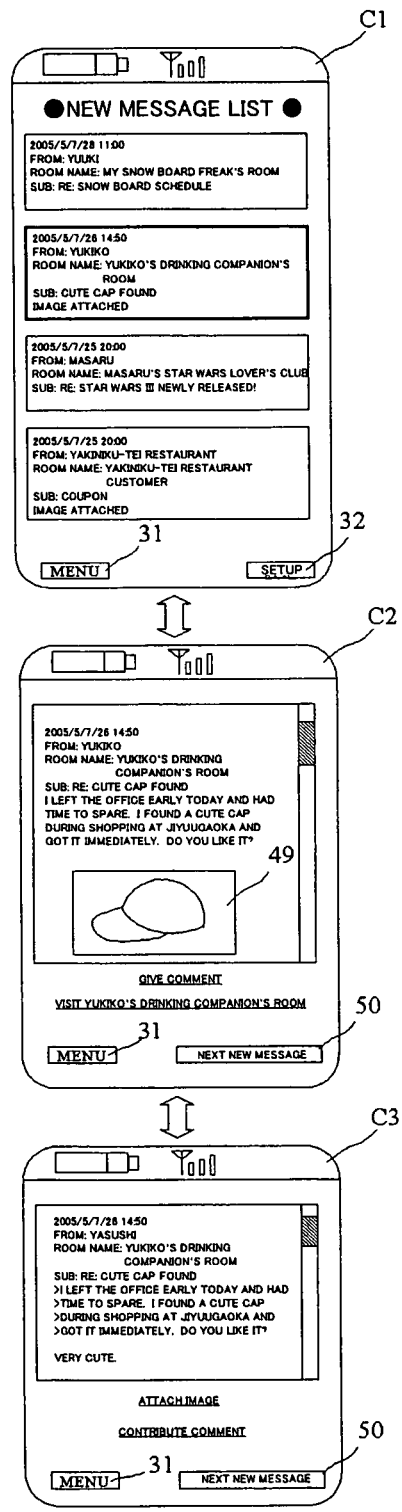
FIG. 7 is a diagram showing a screen transition from a new message list screen on the user terminal in the first embodiment of the present invention.

Next, the following describes the flow of operations performed in the communication system in this embodiment from a time the user references a new message received from a room in which the user is registered to a time the user contributes a return message to the room. FIG. 7 is a diagram showing the screen transition that occurs when the user clicks on "DISPLAY NEW MESSAGE LIST" 35 on the menu screen A2 in FIG. 2.

When the user clicks on the "DISPLAY NEW MESSAGE LIST" 35 on the menu screen A2 in FIG. 2, a message list screen C1 is displayed to show the list of messages received from the content management unit 25 of the server 20 as shown in FIG. 7. (How messages are received periodically from the server 20 will be described later).

Assume that the user clicks on the second message from the top of the message list screen C1 in FIG. 7 " . . . ROOM NAME: YUKIKO'S DRINKING COMPANION'S ROOM; SUB: CUTE CAP FOUND", a detailed message display screen C2 is displayed to show the text of the message and an attached image 49.

In addition, when the user clicks on "GIVE COMMENT" on the detailed message display screen C2 in FIG. 7, a return message input screen C3 is displayed to allow the user to enter a return message to the message. When the user clicks on "ATTACH IMAGE" on the return message input screen C3 in FIG. 7, the screen changes to the selection screen where an image to be attached to the return message is selected. When the user clicks "CONTRIBUTE COMMENT", the return message is sent to the server 20.

When the user clicks on a NEXT NEW MESSAGE button 50 at the bottom of the detailed message display screen C2 in FIG. 7, the next new message, for example, the third message from the top of FIG. 7, is displayed. Therefore, the user can sequentially skim through the new messages by appropriately clicking on the NEXT NEW MESSAGE button 50 with the cursor thereon.

When the user clicks on "VISIT YUKIKO'S DRINKING COMPANION'S ROOM" on the detailed message display screen C2 in FIG. 7, the screen changes to the top page (see E2 in FIG. 9) of the room "YUKIKO'S DRINKING COMPANION'S ROOM". This will be described later.

[Confirm Registered Rooms]

Figure 8:
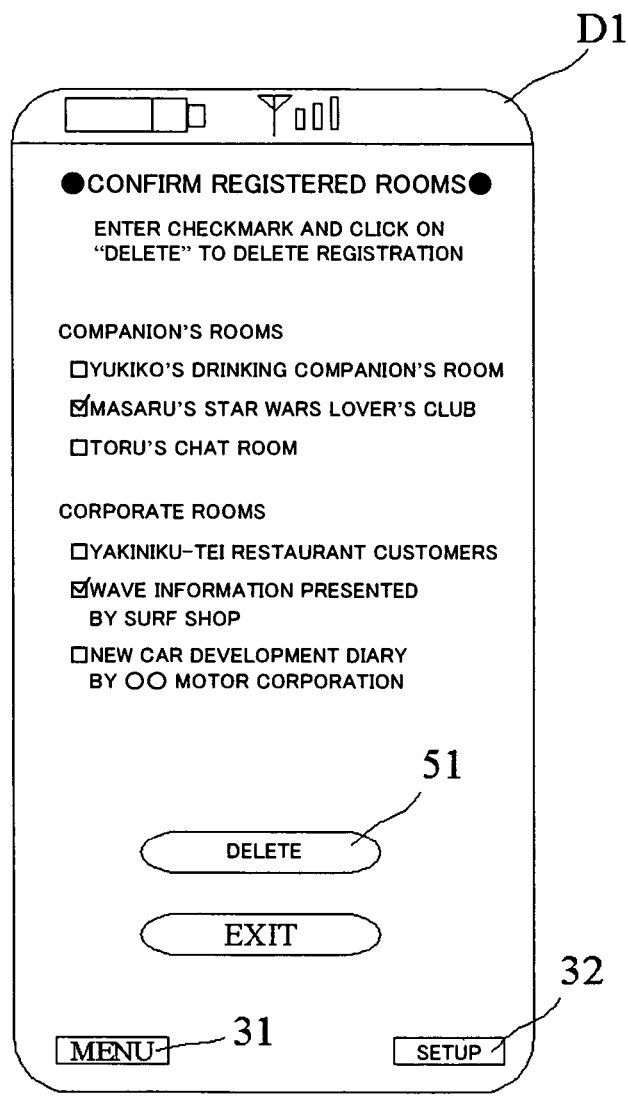
FIG. 8 is a diagram showing a registered room confirmation screen on the user terminal in the first embodiment of the present invention.

Next, the following describes the screen on which the user confirms the rooms in which the user registers in the communication system in this embodiment. FIG. 8 is a diagram showing the screen displayed after the user clicks on "CONFIRM REGISTERED ROOM" 36 on the menu screen A2 in FIG. 2.

When the user clicks on the "CONFIRM REGISTERED ROOM" 36 on the menu screen A2 in FIG. 2, the user terminal 10 asks the server 20 about the rooms in which the user registers and displays the list of rooms in which the user registers as shown in D1 in FIG. 8. This screen provides the user with the information on the cyber communities to which the user belongs.

If necessary, the user can select rooms to be deleted and click on the DELETE button 51, as indicated by the message at the top of the screen in FIG. 8, to send a registration deletion request to the server 20 to delete one or more rooms at a time.

[Browse/Register Room]

Figure 9:
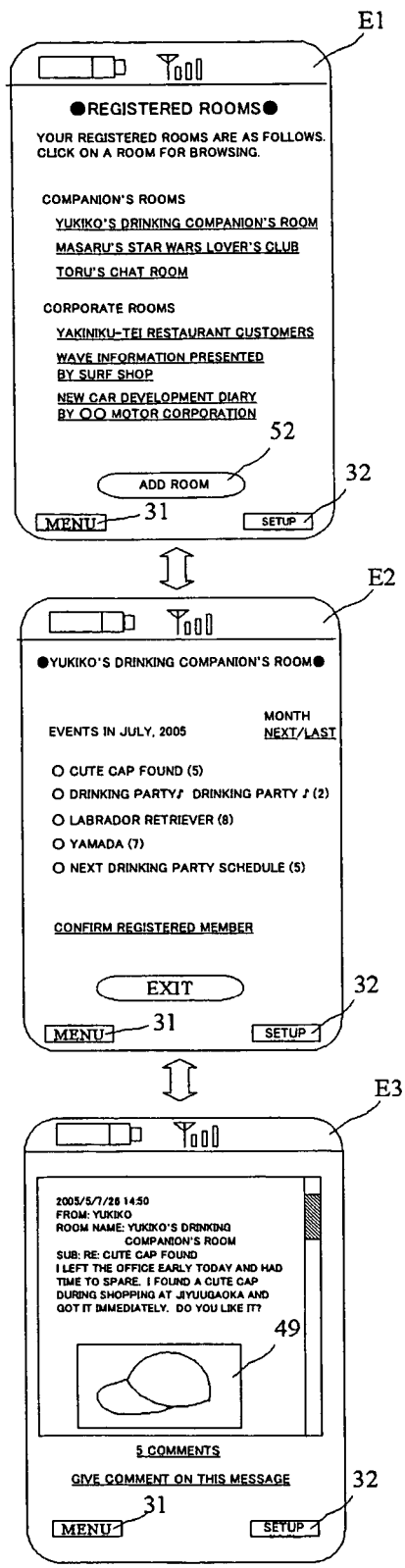
FIG. 9 is a diagram showing a screen transition from a room browse/register screen on the user terminal in the first embodiment of the present invention.

Next, the following describes the flow of operations in which the user enters a room, in which the user registers, and browses the messages stored in the server 20 in the communication system in this embodiment. FIG. 9 is a diagram showing the screen transition that occurs after the user clicks on the "BROWSE/REGISTER ROOM" 37 on the menu screen A2 in FIG. 2.

When the user clicks on the "BROWSE/REGISTER ROOM" 37 on the menu screen A2 in FIG. 2, the user terminal 10 asks the server 20 about the rooms in which the user registers and displays the list of rooms in which the user is now registered as shown in E1 in FIG. 9.

For example, when the user clicks on the room "YUKIKO'S DRINKING COMPANION'S ROOM" displayed at the top of a registered room list screen E1 in FIG. 9, an article list screen E2 on which the list of articles contributed to the room is displayed. Clicking on an ADD ROOM button 52 at the bottom of the registered room list screen E1 in FIG. 9 allows the user, as in X3 in FIG. 6, to check for a room for which the user receives an invitation and to register in that room.

In addition, when the user clicks on any of the articles on the article list screen E2 in FIG. 9, an inquiry request about the selected article is sent to the server 20 and a detailed message display screen E3 is displayed to display the detail of the article. When the user clicks on "CONFIRM REGISTERED MEMBER" on the article list screen E2 in FIG. 9, an inquiry request about the registered members of the room is sent to the server 20 and the list of the members registered in the room is displayed (not shown).

When the user clicks on "5 COMMENTS" displayed on the detailed message display screen E3 in FIG. 9, an inquiry about the messages returned and contributed to the article from other members is sent to the server 20 and the result is displayed in the list format or thread format.

[Search for Corporation Room]

In the communication system in this embodiment, a user cannot register in a personal room (companion's room) unless the user receives an invitation as described above and the even presence of the room is hidden. On the other hand, there is no such restriction on corporation rooms and any user can search for a corporation room and register therein.

Figure 10:
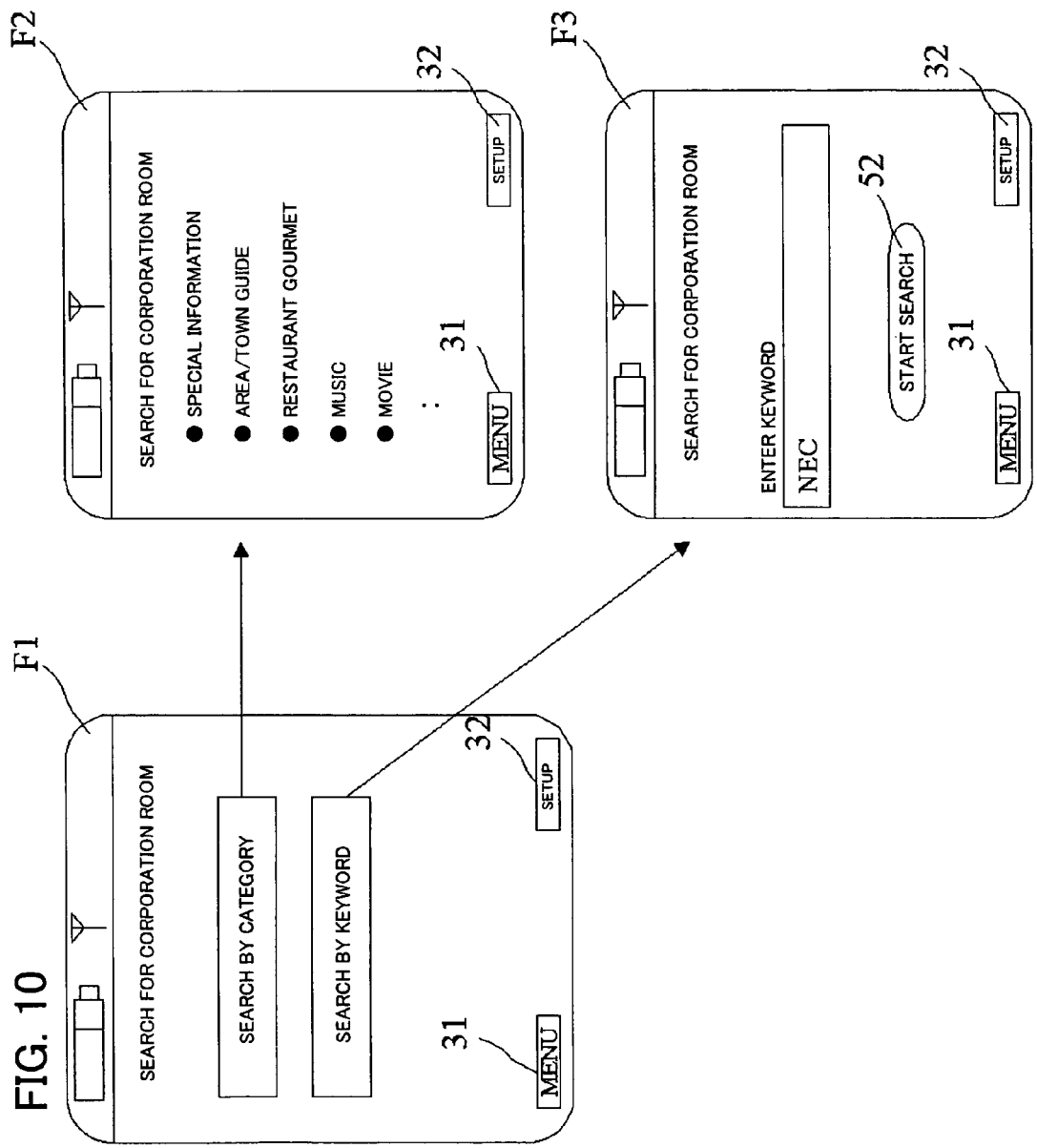
FIG. 10 is a diagram showing a screen transition from a corporation room search screen on the user terminal in the first embodiment of the present invention.

When the user clicks on "SEARCH FOR CORPORATION ROOM" 38 on the menu screen A2 in FIG. 2, a search method selection screen F1 is displayed on the user terminal 10 as shown in FIG. 10. When the user selects "SEARCH BY CATEGORY", a screen F2 provided for searching for a desired room by category is displayed. When the user selects "SEARCH BY KEYWORD", a screen F3 provided for entering a keyword is displayed to allow the user to enter a keyword to search for a desired room by title or keyword included in an introduction message.

Whether or not a user can return a message to an article in a corporation room, which is searched for and in which the user registers, is determined appropriately by a corporation and a service provider such as a carrier. Whether or not a new message from a corporation in which the user registers is displayed on the standby screen can also be determined appropriately according to the contract between the corporation and the service provider.

[Periodical Reception of Messages]

Figure 11:
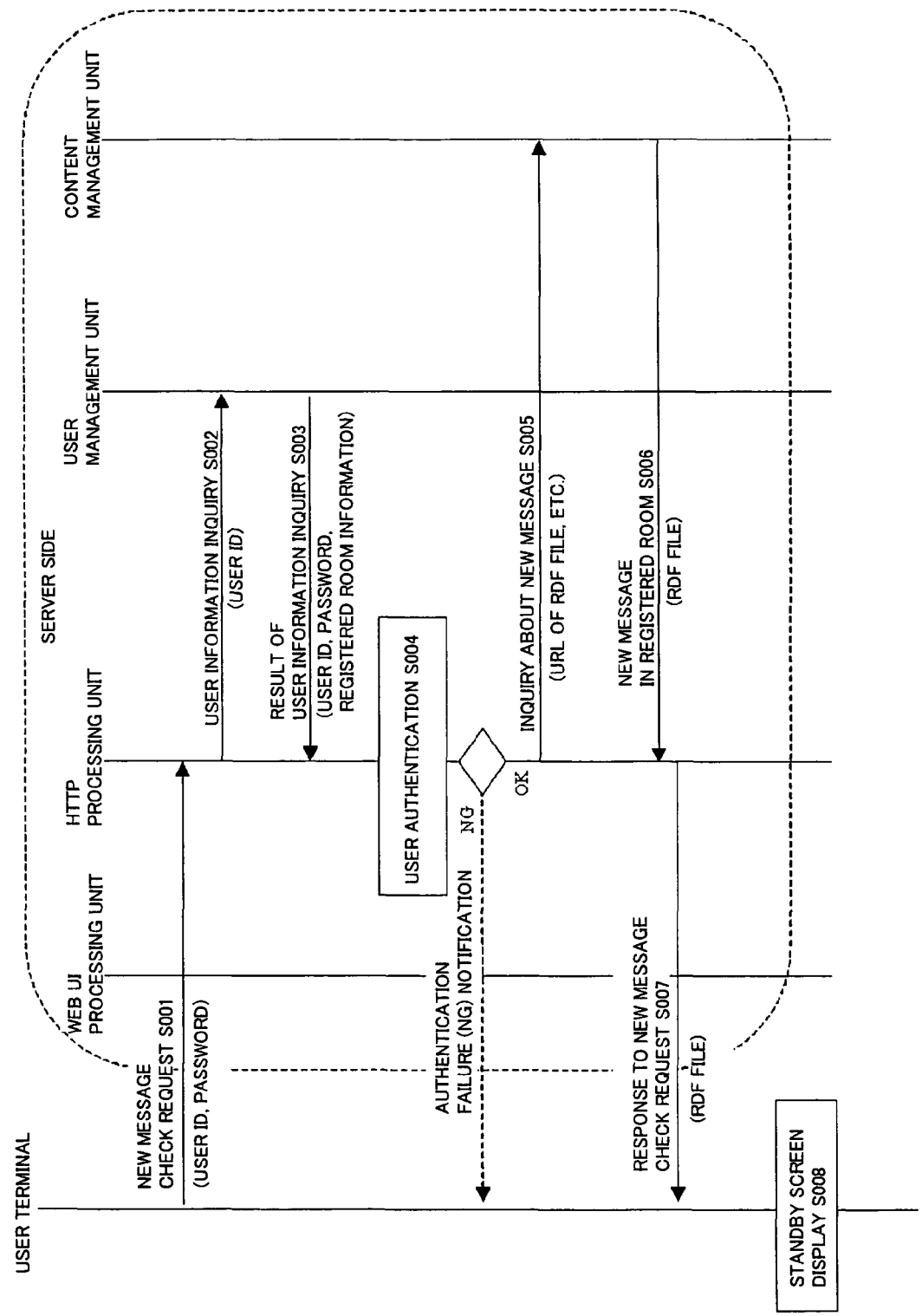
FIG. 11 is a diagram showing the sequence of new message checking flow between the user terminal and a server in the first embodiment of the present invention.

Next, the following describes a method for automatically delivering messages to the user terminal 10 in the communication system in this embodiment. FIG. 11 is a diagram showing the new message confirmation procedure executed between the user terminal 10 and the server 20 at a predetermined time interval.

Referring to FIG. 11, when a time specified in advance by "CHANGE UPDATE TIME" on the setup screen (A3 in FIG. 3) arrives, the user terminal 10 sends a user ID and a password to request the server 20 to check for a new message (step S001).

In response to the new message check request from the user terminal 10, the server 20 references the user information, stored in the user management unit 24, to acquire the password and the registered-room information (for example, URL representing the location of the room) corresponding to the user ID (steps S002, S003).

Next, the server 20 authenticates the user by checking if the user ID matches the password (step S004). If this authentication fails (NG), the server 20 sends an authentication failure notification to the user terminal 10.

If the authentication succeeds (OK) as the result of step S004, the server 20 checks the content management unit 25 if a new message is registered in the room corresponding to the registered-room information acquired in step S003 and prepares a new message in the RDF file format (steps S005 and S006).

When the server 20 sends the RDF file of the new message as a response to the new message check request, the user terminal 10 receives the RDF file and stores it in the memory (the new message list in C1 in FIG. 7 can now be displayed) and, at the same time, obtains the title from the received RDF file, which includes the title as well as the text and the attached image, and displays the obtained title on the standby screen.

Figure 12:
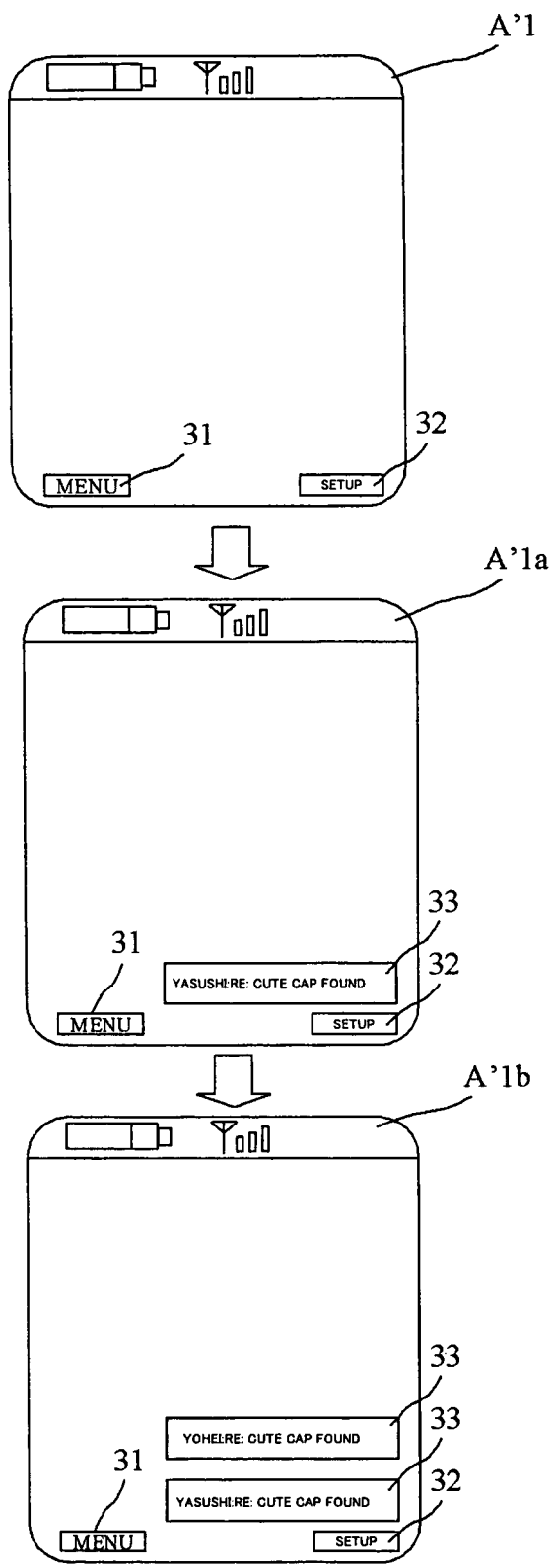
FIG. 12 is a diagram showing how the standby screen changes on the user terminal in the first embodiment of the present invention.

FIG. 12 is a diagram showing an example of how new messages are displayed on the standby screen of the user terminal 10. First, when there is no new message, the tag buttons 33 are not displayed on the standby screen (A'1 in FIG. 12).

When a new message is delivered according to the procedure described in FIG. 11, the tag button 33, which shows the starting part of the title of the received RDF file, is displayed on the standby screen (A'1a in FIG. 12).

If another new message is delivered before the user browses the new message described above, the tag button 33 indicating the newly-received message is displayed above the tag button 33 already displayed on the standby screen (A'1b in FIG. 12). The tag buttons 33 are sequentially added, one on top of the other, in the right half area (band area) in this way. When the tag buttons 33 reach the top of the screen, the screen is scrolled in such a way that the tag buttons 33 of the latest message is displayed at the top of the screen.

Of course, when the new message is browsed or when a mark indicating that the message is an important message is not attached, the tag button 33 is erased. When all new messages are "already-read" and no mark is attached to the messages by the user, the standby screen returns to the screen shown in A'1 in FIG. 12.

In this embodiment, the personal room is provided as communication means that combines the convenience equivalent to that of RSS, the ease-of-use and familiarity of a web log and a bulletin board, and the closed space created by a mailing list.

The corporation room is provided as new advertising means because the user can search through, or register in, the corporation room freely.

Unlike a system that uses a mail server, the communication system in this embodiment uses mail addresses only for invitation and, therefore, reduces the possibility of so-called spam mail.

While the present invention has been described with reference to the embodiment above, it is to be understood that the scope of the present invention is not limited to the embodiments above and that modifications and changes may be made within the spirit of the present invention where the spirit of the present invention resides in that a new message is received in a communication system at a predetermined time interval and received new message or messages is/are displayed on the standby screen in such a way that at least the number of messages can be identified. For example, although tag buttons are used in the embodiments above, buttons, icons, and other similar objects that have title display areas can also be used instead of tag buttons as apparently indicated by the spirit of the present invention. The same effect can also be achieved by displaying a new message reception display list on the standby screen.

For example, although the latest messages are always displayed in the right half area (band area) of the standby screen in the above embodiments with the new messages scrolled vertically, the new messages may also be scrolled horizontally or the oldest message may remain displayed on the standby screen.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A portable communication terminal connectable to a server, said server providing a cyber sub-community in which messages are exchanged among limited members, by delivering a new message or subjecting accumulated messages to browsing, said terminal comprising:

an Hypertext Transfer Protocol (HTTP) communication function configured to access said server at a predetermined time interval and automatically receive at least one new message in the cyber sub-community in which said communication portable terminal received an invitation mail and accepted the invitation mail; and a standby screen display function configured to dynamically display an object comprising text retrieved from the new message on a standby screen of the terminal in response to the arrival of said new message, the standby screen having a menu button, the menu button being configured to display at least a button configured to display available cyber sub-communities, and the new message is sent via an XML (extensible Mark-up Language) file or an RDF (Resource Description Framework) file, each of the files having a title field including a message-issuing member name and a message title, and the title included in the XML file or the RDF file is retrieved from the new message and displayed in said object on the standby screen upon arrival of the new message.

2. The portable communication terminal as defined in claim 1, wherein when a plurality of new messages are received, a plurality of objects each correlating to one new message of the plurality of new messages are displayed on the standby screen, said plurality of objects forming a browse screen to allow a user to review each object by scrolling the browse screen.

3. The portable communication terminal according to claim 1 wherein a font or a background color of the standby screen can be selectively set.

4. A portable communication terminal connectable to a server that provides a cyber sub-community in which a new message is delivered or accumulated messages are browsed for message exchange among limited members, said portable communication terminal comprising:

means for requesting said server to open the cyber sub-community and to send to any address an invitation mail to the cyber sub-community;

means for accessing said server to participate and register in the cyber sub-community in response to an invitation mail from other users; and means for accessing said server, displaying a list of participating cyber sub-communities and accepting a selected cyber sub-community from the list and, at the same time, browsing messages of, and contributing messages to, the selected cyber sub-community, wherein said portable communication terminal accesses said server at a predetermined time interval, automatically receives at least one new message in the cyber sub-community in which said communication portable terminal participates, and dynamically displays an object comprising text retrieved from the new message on a standby screen in response to the arrival of said new message, the standby screen having a menu button, the menu button being configured to display at least a button configured to display available cyber sub-communities, and the new message is sent via an XML (extensible Mark-up Language) file or an RDF (Resource Description Framework) file, each of the files having a title field including a message-issuing member name and a message title, and the title included in the XML file or the RDF file is retrieved from the new message and displayed in said object on the standby screen upon arrival of the new message.

5. A communication system comprising:

a server providing a cyber sub-community in which messages are exchanged among limited members, by delivering a new message or subject accumulated messages to browsing; and a portable communication terminal connectable to said server via a network, said terminal comprising: an Hypertext Transfer Protocol (HTTP) communication function configured to access said server at a predetermined time interval and automatically receive at least one new message in the cyber sub-community in which said communication portable terminal received an invitation mail and accepted the invitation mail; and a standby screen display function configured to dynamically display an object comprising text retrieved from the new message on a standby screen of the terminal in response to the arrival of said new message, the standby screen having a menu button, the menu button being configured to display at least a button configured to display available cyber sub-communities, and the new message is sent via an XML (extensible Mark-up Language) file or an RDF (Resource Description Framework) file, each of the files having a title field including a message-issuing member name and a message title, and the title included in the XML file or the RDF file is retrieved from the new message and displayed in said object on the standby screen upon arrival of the new message.

6. A communication system comprising:

a server providing a cyber sub-community in which messages are exchanged among limited members, by delivering a new message or subjecting accumulated messages to browsing; and a portable communication terminal connectable to said server via a network, said terminal comprising:

means for requesting said server to open the cyber sub-community and to send to any address an invitation mail to the cyber sub-community;

means for accessing said server to participate and register in the cyber sub-community in response to an invitation mail from another user; and means for accessing said server, displaying a list of participating cyber sub-communities and accepting a selected cyber sub-community from the list and, at the same time, browsing messages of, and contributing messages to, the selected cyber sub-community, wherein said portable communication terminal accesses said server at a predetermined time interval, automatically receives at least one new message in the cyber sub-community in which said communication portable terminal participates, and dynamically displays an object comprising text retrieved from the new message on a standby screen in response to the arrival of said new message, the standby screen having a menu button, the menu button being configured to display at least a button configured to display available cyber sub-communities, and the new message is sent via an XML (extensible Mark-up Language) file or an RDF (Resource Description Framework) file, each of the files having a title field including a message-issuing member name and a message title, and the title included in the XML file or the RDF file is retrieved from the new message and displayed in said object on the standby screen upon arrival of the new message.

7. A method of exchanging information between a portable communication terminal and a server accessible by the terminal, the server providing a cyber sub-community in which a new message is delivered or accumulated messages are browsed for message exchange among limited members, said method comprising:

sending a request to said server to open the cyber sub-community and to send to any address an invitation mail to the cyber sub-community;

accessing said server to participate and register in the cyber sub-community in response to an invitation mail from other users;

accessing said server, displaying a list of participating cyber sub-communities and accepting a selected cyber sub-community from the list and, at the same time, browsing messages of, and contributing messages to, the selected cyber sub-community; and accessing said server at a predetermined time interval, automatically receiving at least one new message in the cyber sub-community in which said communication portable terminal participates, and dynamically displaying an object comprising text retrieved from the at least one new message on a standby screen in response to the arrival of said at least one new message, the standby screen having a menu button, the menu button being configured to display at least a button configured to display available cyber sub-communities, and the new message is sent via an XML (extensible Mark-up Language) file or an RDF (Resource Description Framework) file, each of the files having a title field including a message-issuing member name and a message title, and the title included in the XML file or the RDF file is retrieved from the new message and displayed in said object on the standby screen upon arrival of the new message.

8. A non-transitory computer readable storage medium having computer readable program store therein for operating on a computer to exchange information between a portable communication terminal and a server accessible by the terminal, the server providing a cyber sub-community in which a new message is delivered or accumulated messages are browsed for message exchange among limited members, said program comprising instructions that cause the computer to perform the steps of:

sending a request to said server to open the cyber sub-community and to send to any address an invitation mail to the cyber sub-community;

accessing said server to participate and register in the cyber sub-community in response to an invitation mail from other users;

accessing said server, displaying a list of participating cyber sub-communities and accepting a selected cyber sub-community from the list and, at the same time, browsing messages of, and contributing messages to, the selected cyber sub-community; and accessing said server at a predetermined time interval, automatically receiving at least one new message in the cyber sub-community in which said communication portable terminal participates, and dynamically displaying an object comprising text retrieved from the at least one new message on a standby screen in response to the arrival of said at least one new message, the standby screen having a menu button, the menu button being configured to display at least a button configured to display available cyber sub-communities, and the new message is sent via an XML (extensible Mark-up Language) file or an RDF (Resource Description Framework) file, each of the files having a title field including a message-issuing member name and a message title, and the title included in the XML file or the RDF file is retrieved from the new message and displayed in said object on the standby screen upon arrival of the new message.

* * * * *